United States Patent
Woodworth et al.

(10) Patent No.: US 7,007,572 B2
(45) Date of Patent: Mar. 7, 2006

(54) TIRE CHAIN TOOL

(76) Inventors: Tim Woodworth, 407 Northshore, Moses Lake, WA (US) 98837; Dale A. Kingma, 4156 Rd. F NE., Moses Lake, WA (US) 98837; John Stowers, 10828 Rd. 5.2 NE., Moses Lake, WA (US) 98837

( * ) Notice: Subject to any disclaimer, the term of this patent is extended or adjusted under 35 U.S.C. 154(b) by 7 days.

(21) Appl. No.: 10/843,618

(22) Filed: May 12, 2004

(65) Prior Publication Data

US 2004/0226640 A1    Nov. 18, 2004

Related U.S. Application Data

(63) Continuation-in-part of application No. 10/437,284, filed on May 14, 2003, now abandoned.

(51) Int. Cl.
*B60C 27/06* (2006.01)
(52) U.S. Cl. .................................... 81/15.8; 152/213 R
(58) Field of Classification Search ............... 81/15.8, 81/436–437, 488, DIG. 10; 7/138, 166, 7/170; 254/120, 131; 152/217, 219, 213 R
See application file for complete search history.

(56) References Cited

U.S. PATENT DOCUMENTS

| 1,238,647 | A | * | 8/1917 | Derby | 81/15.8 |
|---|---|---|---|---|---|
| 1,372,195 | A | | 3/1921 | Rounds | |
| 1,437,158 | A | * | 11/1922 | Snodgrass | 24/69 TT |
| 1,483,686 | A | | 2/1924 | Searfoss | |
| 1,534,284 | A | * | 4/1925 | Pelletier | 81/15.8 |
| 1,542,629 | A | * | 6/1925 | Massuere | 81/15.8 |
| 1,674,691 | A | * | 6/1928 | Marsh | 81/15.8 |
| 1,716,113 | A | * | 6/1929 | Carlson | 24/68 TT |
| 2,592,096 | A | * | 4/1952 | Young | 81/15.8 |
| 3,408,884 | A | | 11/1968 | Musgrove | |
| 3,680,834 | A | | 8/1972 | Holloway | |
| 3,865,168 | A | * | 2/1975 | Bourcier de Carbon de Previnquieres | 152/213 A |
| 3,888,290 | A | * | 6/1975 | Hess et al. | 152/217 |
| 3,896,687 | A | | 7/1975 | Cloud | |
| 4,042,210 | A | | 8/1977 | Feldmann | |
| 4,210,036 | A | * | 7/1980 | Nakata | 81/15.8 |
| 4,306,602 | A | * | 12/1981 | Nestlen | 152/219 |
| 4,411,176 | A | | 10/1983 | Mason | |
| 5,048,376 | A | * | 9/1991 | Faanes | 81/15.8 |
| 5,079,976 | A | | 1/1992 | Priest | |
| 5,167,737 | A | * | 12/1992 | Sakuma | 152/219 |

FOREIGN PATENT DOCUMENTS

| JP | 10119525 A | | 5/1998 |
|---|---|---|---|
| JP | 10119525 A | * | 5/1998 |

* cited by examiner

*Primary Examiner*—David B. Thomas
(74) *Attorney, Agent, or Firm*—Richard C. Litman

(57) ABSTRACT

A device for installing a tire chain is a one-piece, rugged tool made of ⅜" or ½" steel stock. The tool has a total length of approximately 1 foot. At a first end, the tool has an arcuate shape that terminates in an open channel, which channel functions to grab a chain hook and to lever the hook into engagement with a chain link. The second end of the tool is L-shaped and terminates in an elliptical-shaped member dimensioned to fit a conventional cam-loc tightening device.

8 Claims, 6 Drawing Sheets

TIRE CHAIN TOOL

CROSS-REFERENCE TO RELATED APPLICATIONS

This application is a continuation-in-part of application Ser. No. 10/437,284 filed May 14, 2003 now abandoned.

BACKGROUND OF THE INVENTION

1. Field of the Invention

The present invention generally relates to hand tools. More specifically, the present invention is drawn to a tool adapted to assist in mounting chains on automotive vehicle tires, especially truck tires.

2. Description of the Related Art

Installing chains on truck tires to enhance traction on snow and ice can be a tedious and frustrating procedure. It is important that the chain fits tightly on the tire to prevent the chain from loosely slapping the road surface and truck body thereby causing wear to the chain and damage to the truck.

Many devices have been advanced for simplifying the arduous task of mounting tire chains. For example, U.S. Pat. No. 1,372,195 (Rounds) shows a device for securing a chain to a tire. The device functions as only a temporary securing means and must be removed before the chain can be correctly secured.

U.S. Pat. No. 1,483,686 (Searfoss) is drawn to a lever hook for connecting the ends of tire chains. The device is adapted to remain on the chains as a connector.

U.S. Pat. No. 3,408,884 (Musgrove), U.S. Pat. No. 4,411,176 (Mason) and U.S. Pat. No. 5,079,976 (Priest) disclose tools for installing chains on dual-wheeled vehicles. The tools require that the vehicle be moved forwardly for the chains to be properly mounted.

U.S. Pat. No. 3,896,687 (Cloud) shows a magnetic tire chain installation device. The instant device also requires that the vehicle be moved to properly mount the chains.

U.S. Pat. No. 3,680,834 (Holloway) and U.S. Pat. No. 4,042,210 (Feldmann) are drawn to tools having "working" configurations at both ends thereof. Neither patentee contemplates utilizing the tool to assist in the installation of tire chains.

U.S. Pat. No. 1,437,158 (Snodgrass) is drawn to a tool similar to Applicants' invention. However, the Snodgrass tool utilizes a cup designed to engage a chain hook. Also note that the configuration of Applicants' invention is different from that of the Patentee.

Japanese Patent numbered 10119525 A (Nakao) shows a tool having a cam lock opener at its end. Nakao does not contemplate providing a complete tool as disclosed by Applicants.

None of the above inventions and patents, taken either singly or in combination, is seen to disclose a rugged, one-piece tool for assisting tire chain installation as will be subsequently described and claimed in the instant invention.

SUMMARY OF THE INVENTION

The tire chain device of the present invention is a one-piece, rugged tool made of ⅜" or ½" steel stock. In its preferred embodiment, the tool has a total length of approximately 1 foot, but can be made longer or shorter dependent on a prospective user's preference.

At a first end, the tool is provided with an open channel, which open channel is capable of efficiently grabbing any conventional quick chain hooks and levering the hook into engagement with a chain link. The second end of the tool terminates in an elliptical configuration that is dimensioned to fit a conventional cam-loc structure, which cam-loc structure is common to most truck tire chains. The second end can thereby be utilized to tighten the cam-loc.

Accordingly, the invention is drawn to a tool, which tool can be utilized to aid in the mounting of chains on automotive vehicle tires. The tool is of one-piece fabrication and has-no moving parts. Easy to use, the tool is fabricated from rugged material and will withstand wear and tear. The invention provides improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
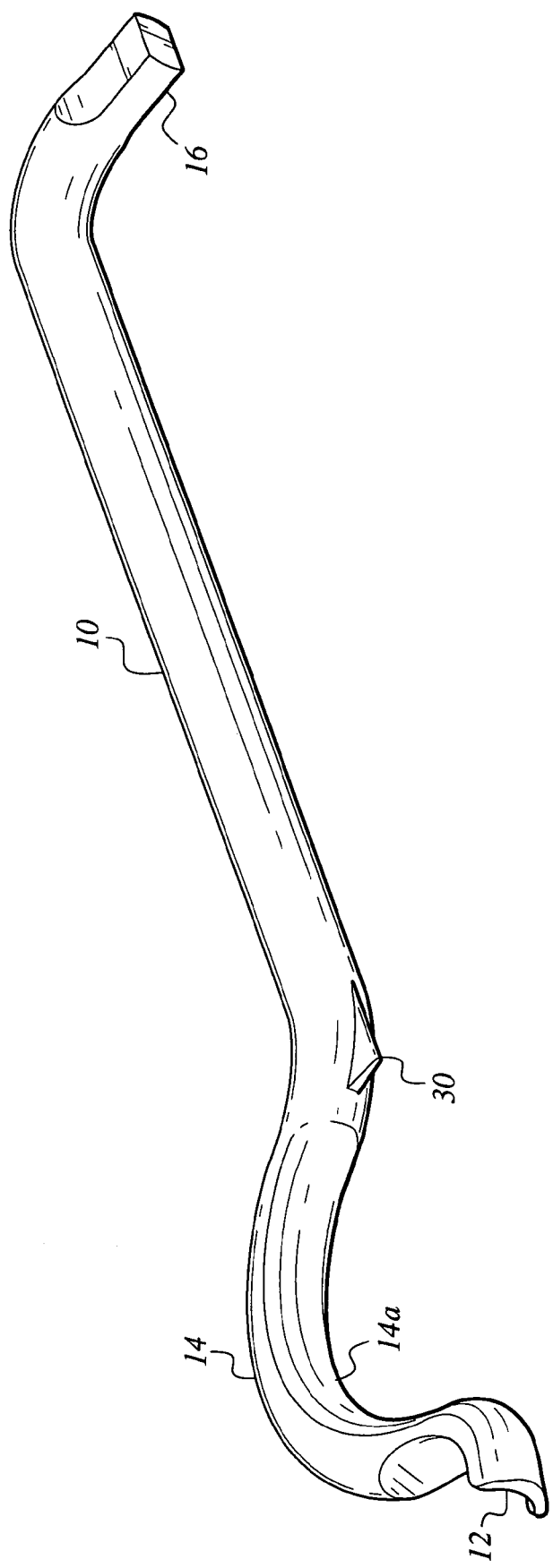
FIG. 1 is a perspective view of a tire chain tool according to present invention.

Attention is first directed to FIG. 1 wherein the tool of the present invention comprises an elongate tubular body 10 fabricated from a rugged material such as steel stock. The proximate end of body 10 is defined by an arcuate portion 14. Portion 14 has an inside surface 14a, which inside surface is beveled in order to reduce the surface area in contact with the chain link. This design decreases the amount of force required to lever the link to engage the hook. Portion 14 terminates in a member 12, which member 12 is configured as an open-end channel. Portion 14 is positioned immediately adjacent portion 12. A triangular-shaped protuberance or nock 30 is positioned at the junction of body 10 and portion 14. Nock 30 prevents the chain link from sliding up the body 10 during the leveraging process and also provides a leveraging point. The distal end of body 10 terminates in an L-shape, from which extends an extruded elliptical member 16. Member 16 is approximately one inch long and is sized to be received in the opening of a conventional chain cam-loc device as will be explained below. Member 16 is positioned in the same vertical plane as portion 14.

Figure 2:
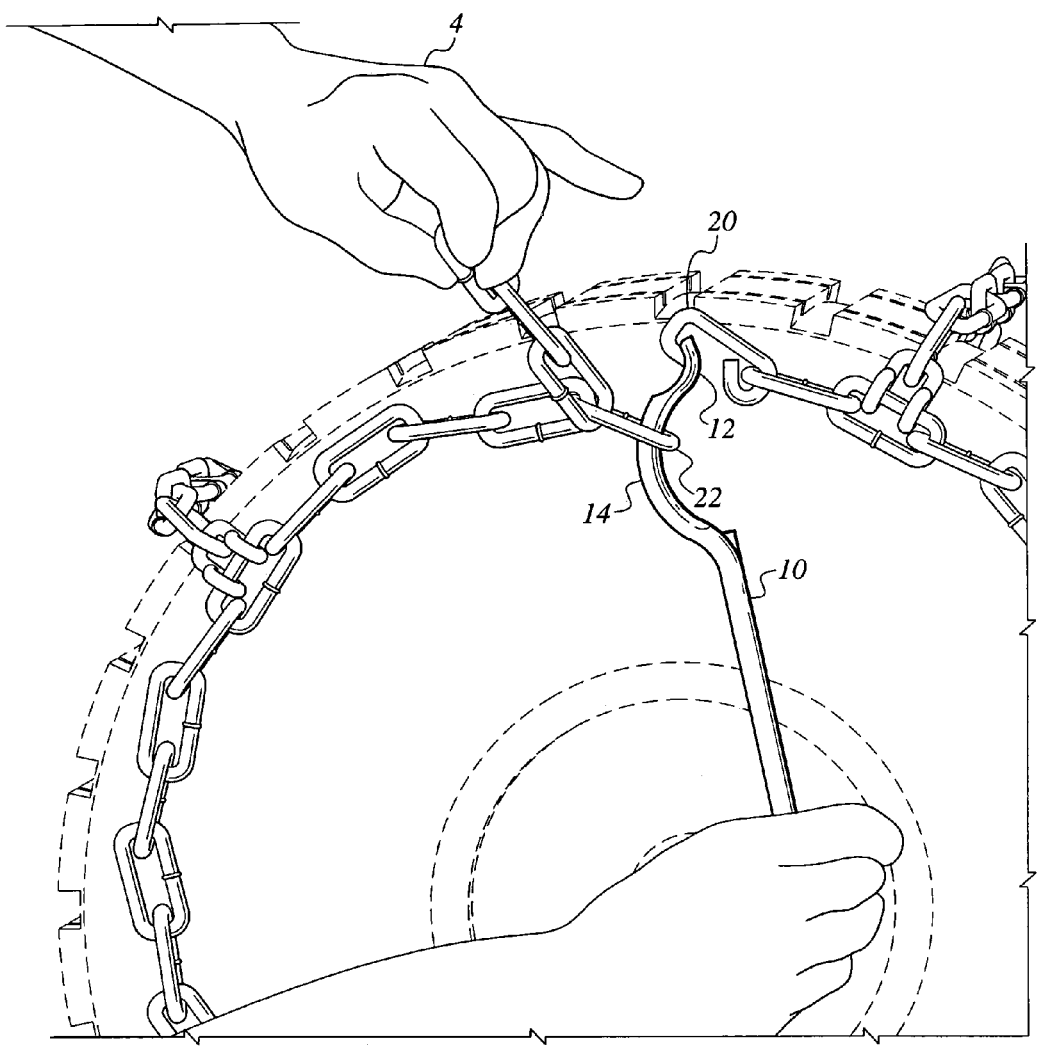
FIG. 2 is an environmental, perspective view of a tire chain tool that shows the tool in an initial installation position according to the present invention.
Figure 3:
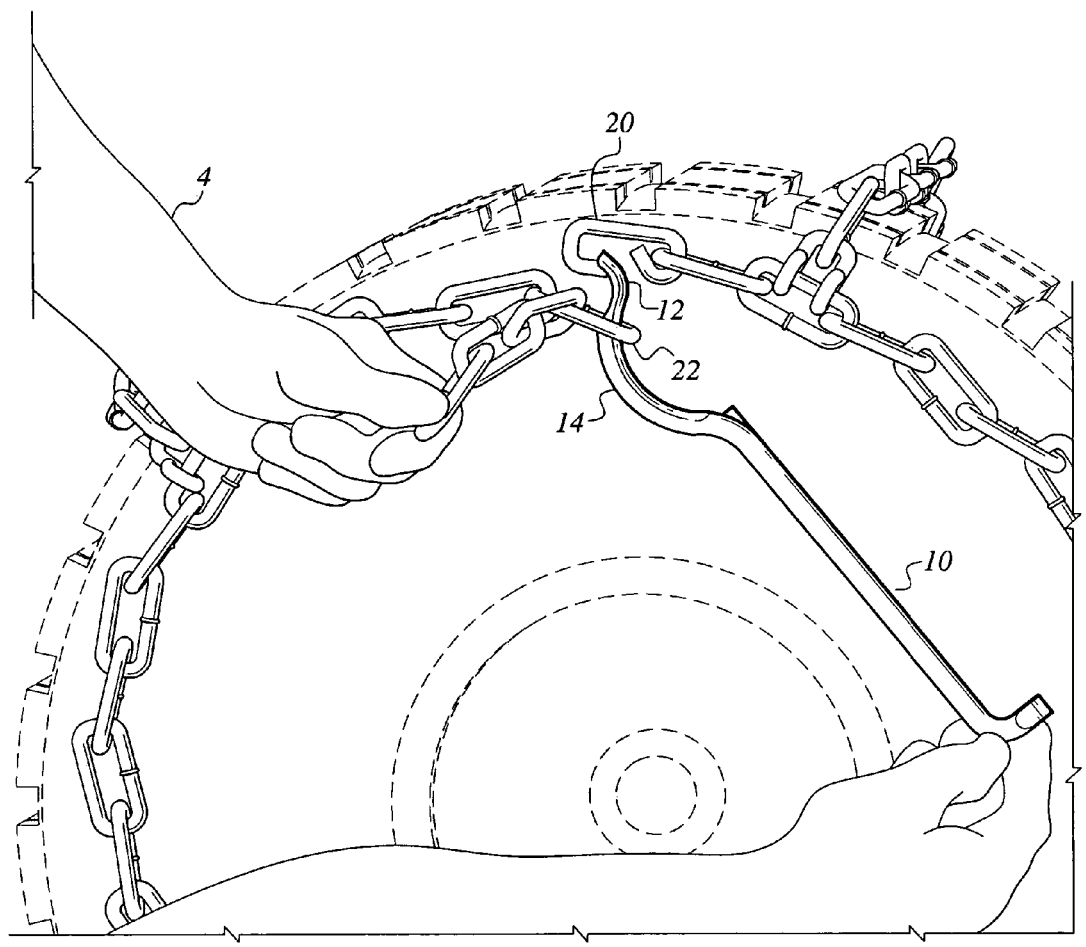
FIG. 3 is an environmental, perspective view of a tire chain tool that shows the tool in an intermediate installation position according to the present invention.
Figure 4:
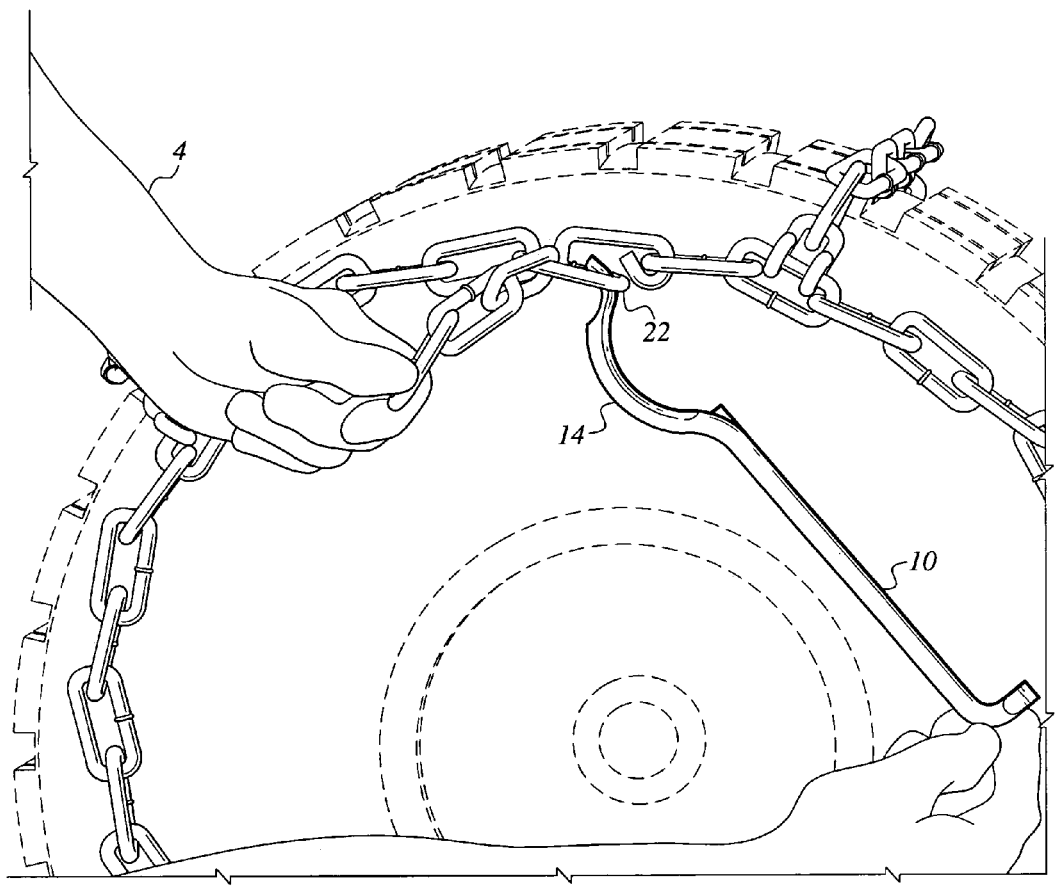
FIG. 4 is an environmental, perspective view of a tire chain tool that shows the tool in a final installation position according to the present invention.
Figure 5:
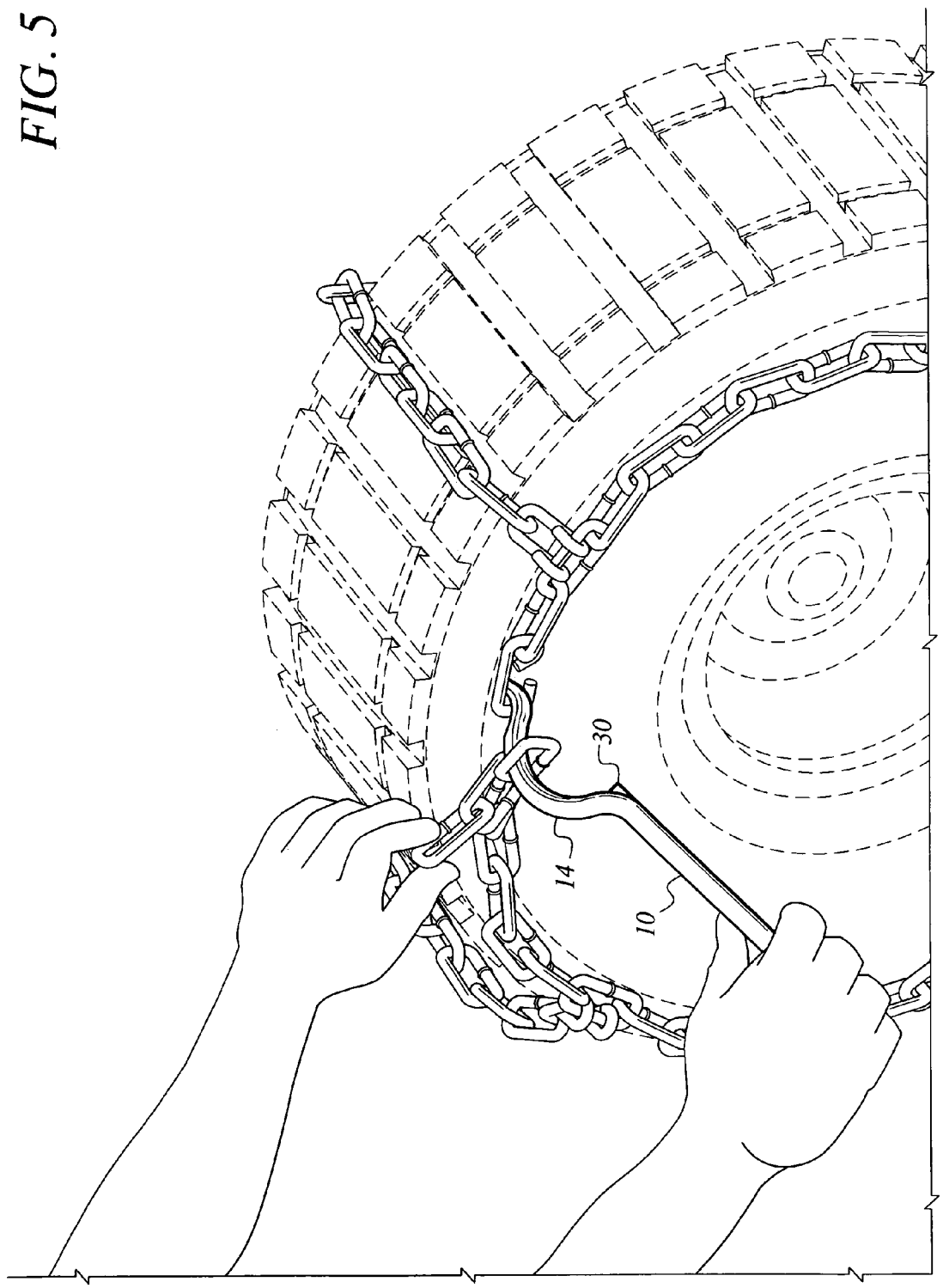
FIG. 5 is an environmental, perspective view of a tire chain tool that shows the tool in an initial installation position engaging the body of a chain link according to the present invention.

Attention is now directed to FIGS. 2–5 wherein the device is illustrated in use. In FIG. 2 the device is shown in the initial position wherein channel portion 12 is manipulated, by a user 4, to grasp the end of a chain hook 20. Note that beveled surface 14*a* is disposed within chain link 22. FIG. 3 shows an intermediate position wherein hook 20 is maneuvered in a position to engage link 22. In a final position (FIG. 4), hook 20 is levered into engagement with link 22. FIG. 5 shows an initial position wherein the channel engages the body of a chain link.

Figure 6:
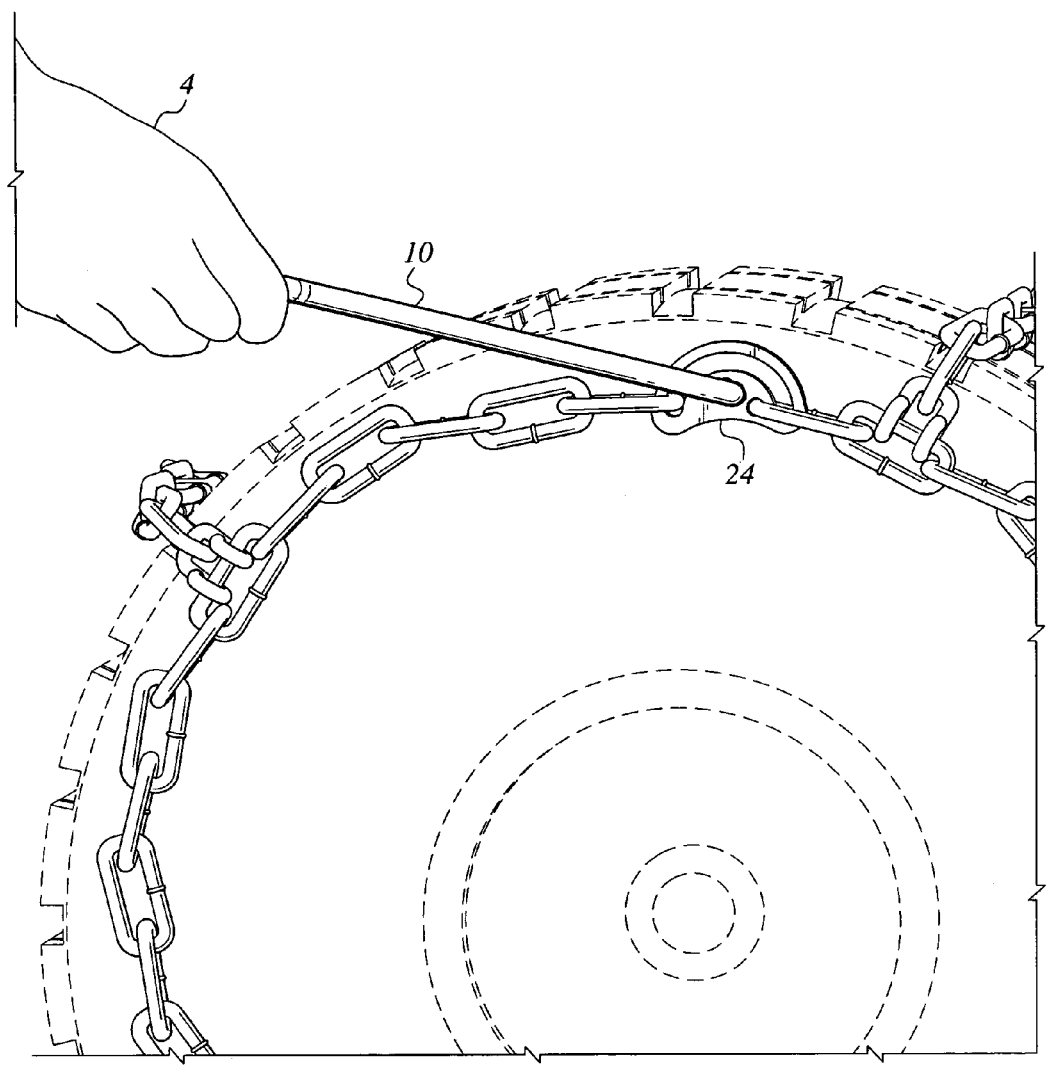
FIG. 6 is an environmental, perspective view of the tool that shows the tool insert in a cam-loc tightener according to the present invention.

FIG. 6 illustrates a scenario where member 16 is inserted in a cam-loc device 24 to tighten the chain.

It is to be understood that the present invention is not limited to the embodiment described above, but encompasses any and all embodiments within the scope of the following claims.

We claim:

1. A tire chain tool, comprising:
   an elongate tubular body member having a proximate end and a distal end;
   an arcuate portion defining said proximate end of said tubular body, said arcuate portion having a beveled inside surface and terminating in an open-ended, channel-shaped tip, wherein said tubular body member and said arcuate portion meet at a junction;
   a triangular-shaped protuberance disposed at said junction; and
   a member for tightening a cam-loc device defining said distal end of said tubular body.

2. The tire chain tool as recited in claim 1, wherein said distal end is of L-shaped configuration.

3. The tire chain tool as recited in claim 1, wherein said member for tightening is an elliptical-shaped member having a length of approximately one inch.

4. A tire chain tool, comprising:
   an elongate body member, said body member being fabricated from steel stock and having a proximate end and a distal end;
   an arcuate portion defining said proximate end of said elongate body member, said arcuate portion having a beveled inside surface and terminating in an open-ended, channel-shaped tip, wherein said elongate body member and said arcuate portion meet at a junction;
   a triangular-shaped protuberance disposed at said junction; and
   an elliptical-shaped member for tightening a cam-loc device defining said distal end.

5. The tire chain tool as recited in claim 4, wherein said body member is approximately one foot long.

6. The tire chain tool as recited in claim 4, wherein said distal end is of an L-shaped configuration and wherein said elliptical-shaped member for tightening is approximately one inch long.

7. A tire chain tool, comprising:
   an elongate body member, said body member being fabricated from steel stock and having a proximate end and a distal end;
   an arcuate portion defining said proximate end of said tubular body, wherein said body member and said arcuate portion meet at a junction, said arcuate portion having a beveled inside surface and terminating in an open-ended, channel-shaped tip;
   a triangular shaped protuberance disposed at said junction; and
   an elliptical-shaped member for tightening a cam-loc device defining said distal end, wherein said arcuate portion lies in a vertical plane and said elliptical-shaped member lies in said same vertical plane.

8. The tire chain tool as recited in claim 7, wherein said distal end is of an L-shaped configuration and wherein said elliptical-shaped member for tightening is approximately one inch long.

\* \* \* \* \*